United States Patent
Blackmon et al.

(10) Patent No.: US 8,542,724 B1
(45) Date of Patent: Sep. 24, 2013

(54) ITERATIVE JOINT MINIMUM MEAN SQUARE ERROR DECISION FEEDBACK EQUALIZER AND TURBO DECODER

(75) Inventors: Fletcher A. Blackmon, Forestdale, MA (US); Ethem M. Sozer, Hyde Park, MA (US); John G. Proakis, Winchester, MA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 441 days.

(21) Appl. No.: 12/880,418

(22) Filed: Sep. 13, 2010

(51) Int. Cl.
*H03H 7/40* (2006.01)
*H03K 5/159* (2006.01)

(52) U.S. Cl.
USPC .......................................... 375/229; 375/324

(58) Field of Classification Search
USPC .................. 375/229–233, 316, 324
See application file for complete search history.

(56) References Cited

U.S. PATENT DOCUMENTS

| | | |
|---|---|---|
| 6,307,901 B1 | 10/2001 | Yu |
| 6,570,919 B1 | 5/2003 | Lee |
| 6,584,143 B2 | 6/2003 | Yu |
| 6,819,630 B1 | 11/2004 | Blackmon |
| 7,088,770 B2 | 8/2006 | Tripathi |
| 7,388,910 B2 | 6/2008 | McKown |
| 7,447,117 B2 | 11/2008 | Yang |
| 2004/0196935 A1* | 10/2004 | Nieto .......................... 375/350 |
| 2005/0243951 A1* | 11/2005 | Wang .......................... 375/340 |

OTHER PUBLICATIONS

Sozer et al., Iterative Equalization and Decoding Techniques for Shallow Water Acoustic Channels, Ocean 2001MTS/IEEE Conference and Exhibition, vol. 4, pp. 2201-2208.*
Ethem Sozer, John G. Proakis and Fletcher A. Blackmon, Iterative Equalization and Decoding Techniques for Shallow Water Acoustic Channels, Oceans 2001MTS/IEEE Conference and Exhibition, vol. 4, pp. 2201-2208, IEEE Conference Publication, Nov. 2001.

* cited by examiner

*Primary Examiner* — Chieh M Fan
*Assistant Examiner* — Freshteh N Aghdam
(74) *Attorney, Agent, or Firm* — James M. Kasischke; Michael P. Stanley

(57) ABSTRACT

An iterative joint Minimum Mean Square Error (MMSE) decision feedback equalizer and turbo decoder includes a turbo decoder portion and a decision feedback equalizer (DFE) portion. The DFE receives input signals and processes these input signals to generate an estimated symbol sequence that is communicated to the turbo decoder portion. The estimated symbol sequence is also communicated to the feedback portion of the DFE. The feedback portion of the DFE includes a symbol-by-symbol detector and a feedback filter. The soft decoder output values generated by the turbo decoder portion are communicated to the feedback portion of the DFE and are combined with the coded output as log likelihood ratio values in a multipass, iterative fashion whereby the equalizer and decoder are linked via iterative feedback to provide communication performance enhancement.

5 Claims, 2 Drawing Sheets

ITERATIVE JOINT MINIMUM MEAN SQUARE ERROR DECISION FEEDBACK EQUALIZER AND TURBO DECODER

STATEMENT OF GOVERNMENT INTEREST

The invention described herein may be manufactured and used by or for the Government of the United States of America for Governmental purposes without the payment of any royalties thereon or therefor.

CROSS REFERENCE TO OTHER PATENT APPLICATIONS

None.

BACKGROUND OF INVENTION

1) Field of the Invention

The present invention is directed to a method utilizing an iterative and an adaptive decision process using output decoder information for use with underwater acoustic telemetry.

2) Description of Prior Art

Traditionally, coherent techniques used in underwater acoustic telemetry employ coherent signals such as multiple phase shift keying (MPSK) and multiple quadrature amplitude modulation (MQAM) signals that are then processed by an adaptive multi-channel decision feedback equalizer (DFE).

The feedback equalizer structure is usually followed by a de-interleaver and an error correction decoder operating in a single pass fashion. The de-interleaver randomizes the errors, and the error correction decoder attempts to correct these randomly distributed errors. The error correction decoder is usually a Viterbi decoder for a convolutional code. The performance obtained using this standard algorithm is acceptable in many situations.

However, the performance can be improved by a different method. This desire for performance improvement leads to higher performance algorithms whose complexity is orders of magnitude greater than the standard decision feedback equalizer followed by de-interleaving and decoding. The turbo-equalization algorithm is one such algorithm that performs much better than the normal algorithm at a cost of high complexity.

The turbo-principle, which was first applied to concatenated codes, can be applied to many detection and decoding problems. The purpose of turbo-coding is to build a strong code by concatenation of simple component codes with a large interleaver so that the decoding can be performed with manageable complexity.

In turbo-equalization, the channel with inter-symbol interference (ISI) including the transmitter and receiver filters is regarded as a linear finite state machine—serially concatenated to the channel convolutional encoder.

In most cases, a serially-concatenated system with an interleaver consists of an outer code; an interleaver permuting the outer code words bits; and an inner finite state machine whose input words are the permuted outer codewords. There are different examples for serially-concatenated systems.

One example is the concatenation of a channel encoder and a non-linear modulator with memory (for example: a continuous phase frequency-shift keying (CPFSK) modulator). Also, concatenation of a convolutional code and a channel with memory can be considered as a serially-concatenated system, and the iterative detection algorithms can be applied to this system.

Iterative detection schemes are sub-optimum detection algorithms with limited complexity for these systems. The optimum decoding algorithms need a trellis with a huge number of states for system memories that are considered. For example, for a system with "v" memories in a convolutional encoder and with an ISI channel with "M" memories and an interleaver size "N", the optimal decoding needs a trellis with $2^{(v+m+N)}$ states.

The soft-in soft-out (SISO) algorithms can be used for both channel equalization and decoding. In such a system, a complex valued sequence "y" can be observed at the output of the receiver filter. The equalizer delivers Log values $L^E(c;0)$ about coded bits. After de-interleaving, the channel decoder delivers Log values $L^D(\hat{u})$ about information bits and Log values $L^D(c;0)$ about coded bits. The log likelihood ratio (LLR) values at the output of the decoder include an extrinsic and an intrinsic part. The extrinsic part is the incremental information about the current bit obtained through the decoding process from all the other bits in the block. It can be calculated by subtraction of the LLR values. The extrinsic information is interleaved and fed back to the equalizer where the information is used as a priori information $L^E(u;I)$ in the new decoding iteration.

However, the complexity of the turbo-equalizer is orders of magnitude greater than the DFE. Complexity grows with channel memory length, modulation level, and spatial and/or time diversity combining. Lower complexity, better performing algorithms than the standard DFE are desired which have lower complexity than that associated with turbo-equalization.

SUMMARY OF THE INVENTION

Systems and methods in accordance with exemplary embodiments of the present invention provide a high performance, low complexity, iterative (multipass) and adaptive decision feedback equalization algorithm using soft output decoder information for use in underwater acoustic telemetry applications.

In accordance with one exemplary embodiment, the present invention is directed to a method for using an iterative joint minimum mean square error equalizer and turbo-decoder to process signals such as input signals received in an underwater acoustic telemetry application. In one embodiment, these input signals can take the form of multiple phase shift keying (MPSK) signals or multiple quadrature amplitude modulation (MQAM) signals.

In accordance with the method of the present invention, a decision feedback equalizer processes the input signals and generates a coded output in the form of an estimated symbol sequence. This generated coded output is fed to a turbo decoder. The turbo-decoder is outside of and separate from the decision feedback equalizer.

The turbo-decoder is used to decode the generated coded output and to generate soft decoder output values. The generated soft decoder output values are communicated to a feedback portion of the equalizer—preferably as log likelihood ratio values.

In addition to the soft decoder output values, the estimated symbol sequence from the DFE is also communicated to the feedback portion of the equalizer. The soft decoder output values are combined with the estimated symbol sequence.

This novel combination is used in a symbol-by-symbol detector to make better informed symbol decisions in the feedback equalizer.

Since the soft decoder output values are log likelihood ratios; the values are calculated for the estimated symbol sequence. The two sets of log likelihood values can be combined. In order to calculate log likelihood values for the estimated symbol sequence; the variance for the estimated symbol sequence is calculated. The computed variance is used to convert the estimated symbol sequence to log likelihood values for subsequent combination with their log likelihood values.

In one embodiment, a variance log likelihood ratio; estimator is used to combine the soft decoder output values with the estimated symbol sequence. In addition, an output sequence of the symbol-by-symbol detector is used as inputs to a feedback finite impulse response filter in the decision feedback equalizer.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein like reference numerals and symbols designate identical or corresponding parts throughout the several views and wherein.

DETAILED DESCRIPTION OF THE INVENTION

Exemplary embodiments of systems and methods in accordance with the present invention provide an iterative joint Minimum Mean Square Error (MMSE) decision feedback equalization and turbo decoder technique. The technique improves the performance of a traditional adaptive decision feedback equalizer followed by turbo-decoding with no feedback while maintaining reasonable complexity.

Figure 1:
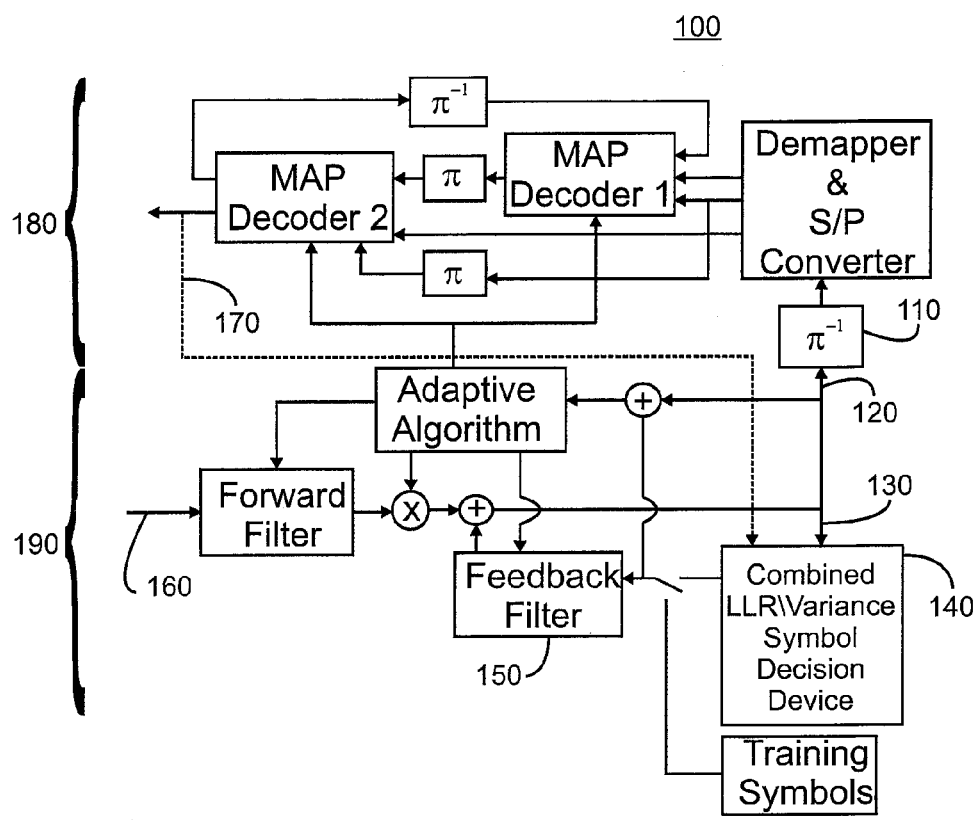
FIG. 1 is a schematic of an embodiment of the joint minimum mean square error decision feedback equalizer and turbo decoder of the present invention.

Referring initially to FIG. 1, an embodiment of an iterative joint MMSE decision feedback equalizer (DFE) and turbo decoder 100 is illustrated. The DFE and turbo-decoder 100 includes a turbo-decoder portion 180 and a DFE portion 190. Suitable arrangements for the turbo-decoder portion 180 and DFE portion 190 are known and available in the art. The DFE 190 receives input signals 160 and processes these input signals to generate a coded output 120 that is an estimated symbol sequence based on the input signals.

The coded output 120 is also communicated to the turbo-decoder portion 180 through a de-interleaver 110. Suitable de-interleavers are known and available in the art. The coded output 120 is also communicated to the feedback portion of the DFE 130. This feedback portion of the DFE 190 includes a combined LLR/Variance symbol decision device 140 that is arranged to make symbol decisions in the DFE and a feedback filter 150.

In one embodiment, the feedback filter 150 is a finite impulse response (FIR) feedback filter. In addition, to the coded output 120, soft decoder output values 170 that are generated by the turbo-decoder portion 180 are communicated to the feedback portion of the DFE. In particular, the soft decoder output values are communicated to the combined LLR/Variance symbol decision device 140 and combined with the coded output 120—preferably as log likelihood ratio (LLR) values.

Typically simulation results for a standard DFE followed by a turbo-decoder operating in a non-jointly iterative fashion showed that for low signal-to-noise ratios (SNR's), the performance of this system is not satisfactory. This situation is because at the low signal-to-noise ratios (SNRs), the DFE experiences error propagation and the turbo-decoder algorithm generates burst errors. Embodiments in accordance with the present invention mitigate DFE error propagation.

This reduction-in-error propagation is mitigated by feeding back the soft decoder output (i.e., turbo-decoder output values 170) in the form of LLR values for the coded bits to the combined LLR/Variance symbol decision device 140 of the DFE portion 190 as tentative decisions replacing the decision-directed decisions that the DFE normally uses. These LLR values can be improved and updated by iterating the combined equalizer and turbo-decoder system for a number of times.

Preferably, the joint MMSE DFE and turbo-decoder 100 uses the estimated symbol sequence from the DFE 190 as an additional input into the combined LLR/Variance symbol decision device 140. When only the decoded values for the coded symbols are used in the feedback FIR filter 150, a portion of the information about the detected symbols that is provided by the DFE is lost. Therefore, the information including the soft LLR values of the coded symbols out of the turbo-decoder and the soft information about the detected symbols provided by the DFE in decision directed mode of operation is used. This novel combined information is then used to make a symbol decision in the combined LLR/Variance symbol decision device 140.

The method used to combine the soft decoder output values with the estimated symbol sequence considers the different forms of the information streams. The soft feedback information from the turbo-decoder is of LLR type and the estimated symbol sequence, $\{\hat{I}_k\}$, is the DFE estimator output.

Assuming that the DFE is doing perfect channel equalization at each symbol iteration and that the DFE can remove all the intersymbol interference (ISI) from the $\{\hat{I}_k\}$ sequence; the LLR value for $\{\hat{I}_k\}$ can be calculated. Since the ISI has been assumed to be removed by the DFE; the estimated signal has a normal probability density function (pdf) with an unknown variance. Hence:

$$L(\hat{I}) = \ln \frac{p(c_k = +1|\hat{I})}{p(c_k = -1|\hat{I})} = \ln \frac{\frac{1}{\sqrt{2\pi}\sigma}\exp\left(-\frac{1}{2\sigma^2}|\hat{I}-1|^2\right)}{\frac{1}{\sqrt{2\pi}\sigma}\exp\left(-\frac{1}{2\sigma^2}|\hat{I}+1|^2\right)} = \frac{2}{\sigma^2}\cdot\hat{I} \quad (1)$$

where $\sigma^2$ is the variance of $\{\hat{I}_k\}$. Therefore, the variance of the estimated sequence $\{\hat{I}_k\}$ is computed and the estimated sequences are converted to LLR values.

Figure 2:
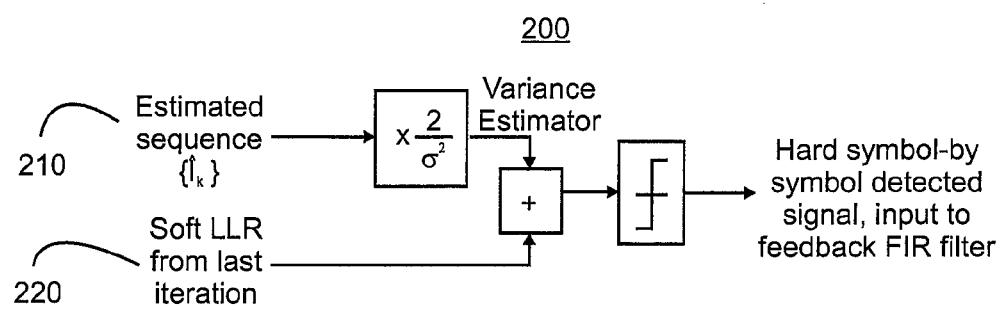
FIG. 2 is a schematic of an embodiment of a symbol-by-symbol detector in an iterative decision feedback equalizer with soft feedback.

This LLR value and other soft valued LLR values of the feedback from the previous iterations are used to make a decision in a symbol-by-symbol detector module 200 illustrated in FIG. 2.

The variance of the $\{\hat{I}_k\}$ sequence 210 is computed and is combined with the soft valued LLR of the feedback from the previous iterations 220. This result yields a hard symbol-by-symbol detected signal 230 that is input into the feedback FIR filter 150 of FIG. 1. The variance of the $\{\hat{I}_k\}$ sequence is computed by the following recursive equation:

$$\sigma_k^2 = \frac{(k-1)\cdot\sigma_{k-1}^2 + (|\hat{l}_k|-1)^2}{k} \qquad (2)$$

In the joint MMSE DFE and turbo decoder 100 of the present invention—as illustrated in FIG. 1, the inputs of the feedback FIR filter 150 have been replaced with the output sequence from the combined LLR/Variance symbol decision device 140. This system has improved performance in low signal-to-noise ratios compared to the standard DFE followed by non-jointly iterative turbo decoding.

The joint MMSE DFE and turbo decoder 100 replaces the standard DFE structure followed by non-jointly turbo decoding with an iterative structure that combines the DFE and the turbo decoder block. The iterative joint MMSE DFE and turbo decoder 100 iterates the combined structure of the normal DFE structure followed by a turbo decoder. Therefore, the most likely coded output of the DFE 190 is interleaved and passed back to the symbol decision device of the DFE to determine the training sequence for the DFE equalizer to be used as the new reference instead of using only the decision-directed mode of equalizer operation.

In addition, the decision-directed feedback values are converted to LLR values and input to the DFE's decision device. After the initial pass through the system, iterations of the joint iterative DFE and turbo decoder system (i.e., multiple passes through the system or loops through the system) the LLR values of the coded reference signal from the turbo decoder are combined with the decision-directed equalizer symbol estimates by using a variance log-likelihood ratio estimator. These combined LLR values are passed to the symbol-by-symbol detector that determines which symbol of the possible symbols was detected. This symbol estimate is fed back so that the next sequential symbol can be processed. This iterative occurs or until a stop criterion has been reached.

The performance of the iterative joint MMSE DFE and turbo decoder is superior to the standard DFE followed by the turbo decoder in the non-iterative structure. The performance improvement in the joint iterative MMSE DFE and turbo decoder technique is due to using a turbo decoder by iterating the combined equalizer and decoder sections a number of times; combining the decision directed DFE's LLR symbol estimates with the decoder's LLR estimates during each iteration to better determine the symbol to feedback within the equalizer for each symbol in the data packet for each iteration.

This algorithm has linear complexity growth with the size of the symboling constellation as opposed to more complex algorithms such as turbo-equalization which experiences exponential complexity growth. Other benefits of the method of the present invention is that the method takes advantage of the attractive features of the DFE such as diversity combining, modest complexity increase with channel complexity, symbol synchronization, and phase tracking while providing higher performance than a standard DFE followed by a non-jointly iterative turbo decoder with less complexity than the turbo-equalizer.

It will be understood that many additional changes in details, materials, steps, and arrangements of parts which have been described herein and illustrated in order to explain the nature of the invention, may be made by those skilled in the art within the principle and scope of the invention as expressed in the appended claims.

What is claimed is:

1. A method for underwater acoustic telemetry utilizing an iterative joint minimum mean square error equalizer and turbo decoder, said method comprising the steps of:
   processing input signals with a decision feedback equalizer;
   generating a coded output comprising an estimated symbol sequence;
   feeding the generated coded output to a turbo decoder with the turbo decoder outside of and separate from the decision feedback equalizer;
   feeding the estimated symbol sequence into a feedback portion of the equalizer;
   decoding the generated coded output with the turbo decoder;
   generating soft decoder output values;
   feeding the generated soft decoder output values to the feedback portion of the decision feedback equalizer;
   combining the soft decoder output values with the estimated symbol sequence; and
   using the combined soft decoder output values and estimated symbol sequence in a symbol-by-symbol detector to make symbol decisions in the decision feedback equalizer.

2. The method of claim 1, wherein the soft decoder output values comprise log likelihood ratios and said step of combining the soft decoder output values with the estimated symbol sequence further comprising the step of calculating log likelihood values for the estimated symbol sequence.

3. The method of claim 2, wherein said step of calculating log likelihood values further comprises the steps of:
   computing a variance for the estimated symbol sequence; and
   converting the estimated symbol sequence with the computed variance to log likelihood values.

4. The method of claim 2, wherein said step of combining further comprises using a variance log likelihood ratio estimator to combine the soft decoder output values with the estimated symbol sequence.

5. The method of claim 1, further comprising the step of using an output sequence of the symbol-to-symbol detector as inputs of a feedback finite impulse response filter in the decision feedback equalizer.

* * * * *